Sept. 21, 1971  H. J. FINKELDEI  3,606,940
RATCHET SWITCHABLE INTO OPPOSITE DIRECTIONS OF OPERATION
Filed Jan. 5, 1970  3 Sheets-Sheet 3
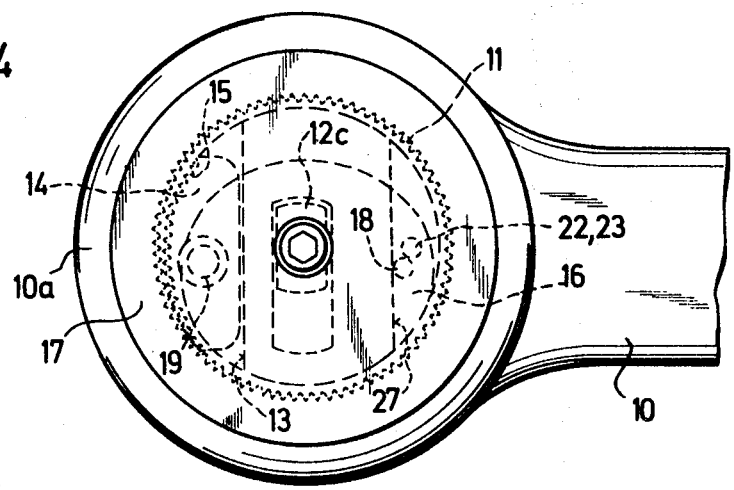
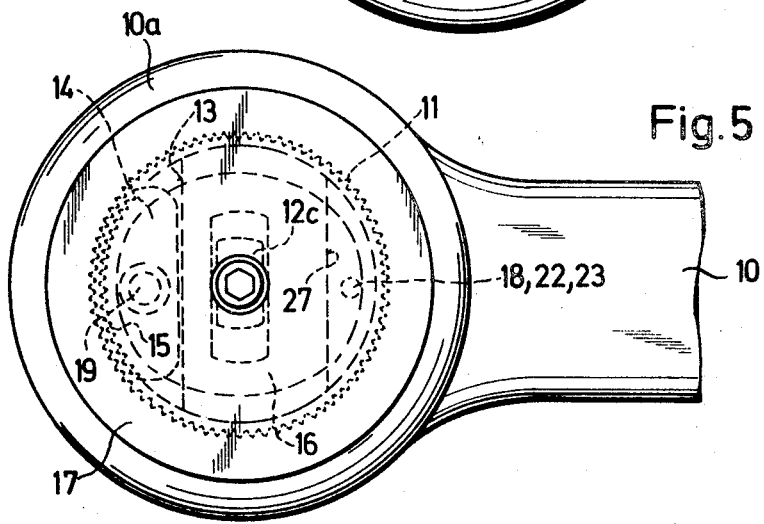
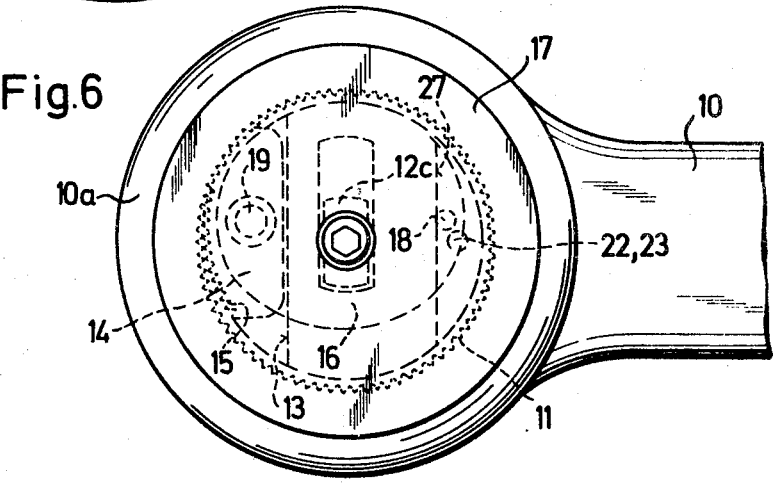

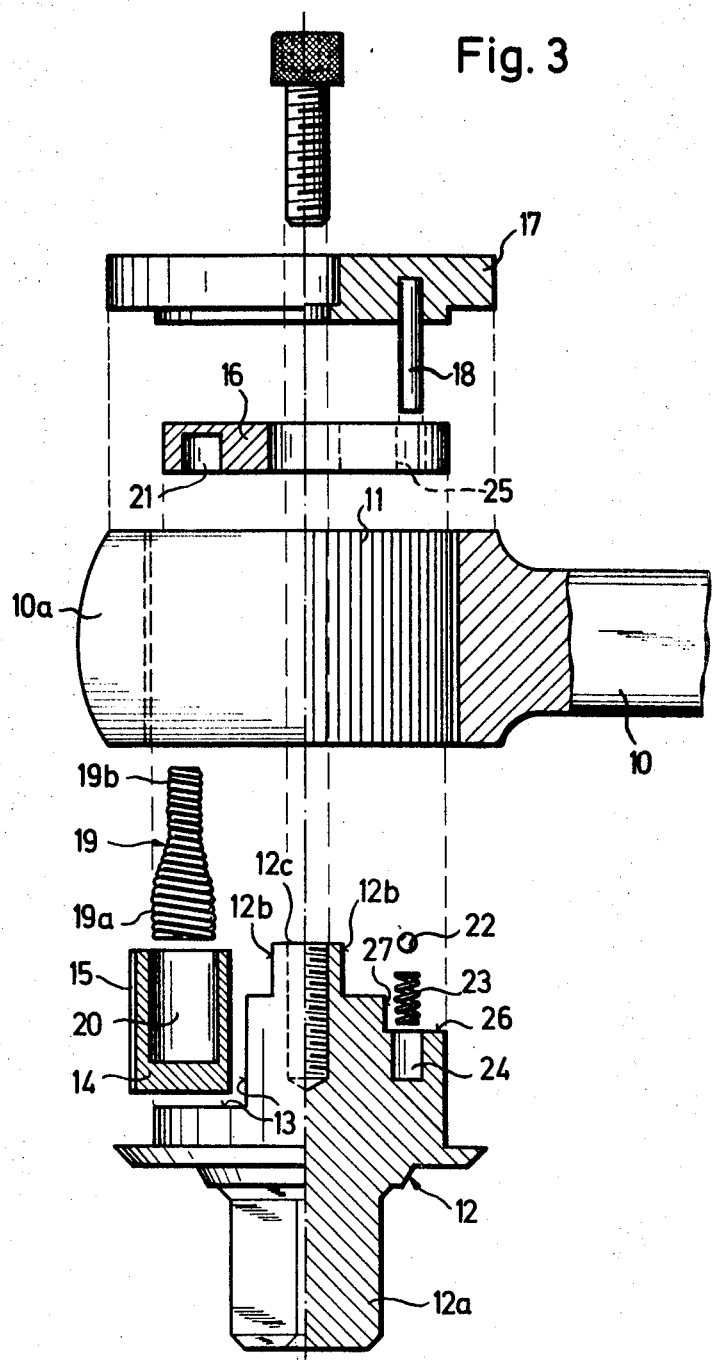

United States Patent Office 3,606,940
Patented Sept. 21, 1971

3,606,940
RATCHET SWITCHABLE INTO OPPOSITE DIRECTIONS OF OPERATION
Hans Joachim Finkeldei, Wuppertal-Nachstebreck, Germany, assignor to Firma Walter Finkeldei Werkzeugfabrik, Wuppertal-Wichlinghausen, Germany
Filed Jan. 5, 1970, Ser. No. 738
Claims priority, application Germany, Jan. 11, 1969,
P 19 01 338.8
Int. Cl. F16d 11/06, 13/04, 23/00
U.S. Cl. 192—43.1
3 Claims

ABSTRACT OF THE DISCLOSURE

A ratchet switchable into opposite directions of operations for a screw operation of screws and nuts, which comprises a gripping part formed at its free end as a gripping handle, and forming at its other end a joint-bearing ring having inwardly extending teeth. A drive member is equipped with an axial coupling projection. A switching segment has outwardly extending teeth and is supported on a step-shaped secantial recess of the drive members which is provided as coupling member between the joint-bearing ring and the drive member. A switching cover, and a switch-over member are mounted on the drive member and operable by the switching cover by switching over in the sense of a change of operating direction. The switching-over member comprises a substantially annular sliding disc. A sliding block has oppositely disposed parallel guide edges and the sliding disc is linearly guided as an axial projection of the drive member in a direction crosswise to the longitudinal axis and full-faced supported outside of the sliding block on the drive member. The sliding block has on opposite points peripherally closed, axially directed receptacles for each coupling member connecting the switching cover with the sliding disc, as well as the latter with the switching segment, whereby the coupling member connecting the switching cover with the sliding disc is formed as an arresting pin passing through the sliding disc in an axially extending passing opening. The arresting pin is formed at its lower free end with a ball snapping device for the arresting of the working positions of the ratchet. The ball snapping device is received within a set step of a secantial recess of the drive body, while the coupling member connecting the sliding disc with the switching segment is formed as a switching joint having resilient rod characteristics self-elastic and return resilient crosswise to its longitudinal axis. The switching joint is received within an axial bearing receptacle on the side of the switching segment and in a recess provided in the sliding disc in axial direction of the bearing receptacle, respectively.

The present invention relates to a ratchet switchable in opposite working directions for the screw operation of screws and nuts, with a gripping part formed at its free end as a gripping handle, which gripping part is designed at its other end as a joint-bearing ring, having inwardly extending teeth in which bearing ring is provided a drive member equipped with an axial coupling projection, as well as a switching segment, supported on a step-like secantial recess of the drive member, as a coupling member between the joint bearing ring and the drive member, which switching segment has outwardly extending teeth, the gripping part is controllable for switching the direction of operation by an upper switching member operable by the switching cover and mounted on top of the driving member.

Ratchets, switchable in opposite working directions of the above described type are known for instance by U.S. Pat. No. 2,981,389, as shown in particular in FIG. 10 of said patent. In the ratchets disclosed in said patent, the switching segment is also switch-controlled from the switching cover by means of a switching member. These switching members, which are formed as narrow, web-like flat structural elements, mounted for a swinging movement, have, at their end pointing towards the switching segment, control recesses laterally opposite, one side open, and having substantially wedge-shaped configuration, which control-recesses cooperate with a joint pin each disposed spaced apart from each other and projecting on the side of the switching segment, in the direction of the switching movement of the switching segment. On the side of the switching member opposite from the switching segment a joint of the switching cover grips a joint of the switching member in a lever arm extremely short relative to the rotary point of this switching member and, thereby unfavorable for handling.

This switching member of the known type has, however, a number of drawbacks, insofar as, on the one hand, no forced connection is present between the switching member and the switching segment, so that a disturbance-free switching operation is not absolutely warranted. But, on the other hand, the lever ratios between the rotary pivot point and the rotary axis of the switching member have a disadvantageous effect on the operation.

It is, therefore, one object of the present invention to provide a ratchet, which in view of the recognition of these drawbacks, just in this direction an improvement is provided, which is brought about such, that the switching member is designed as a sliding disc substantially annular linearly guided as axial projection of the drive member in the direction crosswise to the longitudinal axis of the drive member and on a sliding block having opposite parallel guide edges supported full-faced outside of the sliding block on the drive member. The sliding disc has at opposite points along the periphery closed, axially directed receptacles for each coupling and joining member, respectively, connecting, on the one hand, the switching cover with the sliding disc and, on the other hand, the latter with the switching segment, whereby the coupling member connecting the switching cover with the sliding disc is formed as an arresting pin extending through the sliding disc in an axially projecting push-through opening, which at its lower free end is formed with a ball snapping device, for arresting of the working positions of the ratchet, received within a set step of a secantial recess, while the coupling member connecting the sliding disc with the switching segment is formed as crosswise to its longitudinal axis, self elastic and resilient, respectively, switching joint member, having resilient rod characteristics, which switching joint member on the one end is received at one end within a switching segment axial bearing reception and, on the other end, in a recess provided in an axial extension of this bearing receptacle.

By the practical realization of the present invention, a ratchet designed no more as before, with a rotary swingable switching member, rather a ratchet, equipped with a sliding disc displaceable crosswise to the longitudinal axis of the drive member, is designed in its operation particularly in view of the switching over of the switching segment safer and more reliable than before, because the sliding disc of the present invention can not only be guided linearly on a sliding block of the drive body having parallel guide edges and because beyond that this novel sliding disc achieves engagement on the outside of the sliding body on an appreciably larger face on the drive member and is reliably secured against rotation and tipping.

But not only in view of the reliable control and mounting of the sliding disc, is the present invention characterized to a great extent, rather it brings also additional advantages such, that now a switching joining member between the sliding disc and the switching segment finds application, which switching segment is designed as a self elastic and resilient, respectively, spring rod crosswise to its longitudinal axis. This spring rod fulfills a multiple function, so far as, on the one hand, it is in a position to load continuously the switching segment in the direction of its decoupling from the inwardly extending teeth of the joining bearing ring, on the other hand, it holds in engagement in the working positions always the first engaging tooth of the switching segment resiliently with the inwardly extending teeth of the joining bearing ring. This effect is still supported by the fact that the sliding guide slot has within the sliding disc its own length surpassing the length of the pure switching stroke, so that thereby the coupling spring stays under pretension and also can spring back against the engagement direction.

A practically most desirable embodiment of the elastic switching joining member can be realized, by example, such, that it is formed as a helical spring, e.g. as a step helical spring, reducing itself at least over a part of its axial length and that thereby the spring receptions are adjusted corresponding to the diameters of the helical spring steps in case of a closing spring engagement, whereby the spring recess receiving the helical spring step of larger diameter has an own axial depth surpassing the helical spring step and thereby, overcomes the screw spring step of smaller diameter on parts of its axial length with a radial play.

In such embodiment, on the one hand, this step-like helical spring finds a safe hold in the bearing reception on the side of the switching segment, as well as on the side of the sliding disc bearing reception, rather beyond that also a radial resiliency of the step section of the spring smaller in diameter in the bearing reception on the side of the switching segment is obtained so that this switching joinder assumes in addition to its joinder characteristics also automatically balancing functions.

And finally, in connection with the proposed invention in structural direction another advantage presents itself, that the coupling member between the switching cover and the sliding disc is simultaneously designed as an arresting pin axially projecting through sliding disc, which arresting pin cooperates with a ball snapping device on the side of the drive member, so that the structural element assumes likewise a double function, on the one hand, in the sense of a joinder and, on the other hand, in relation to the arresting.

Due to the fact that this ball snapping device is provided within the set step of a secantial recess of the drive member, additionally the axially extending recess wall can be used as abutment wall for the arresting pin, so that also the switching cover finds its abutment in the working switching positions.

With these and other objects in view, which will become apparent in the following detailed description, the present invention will be clearly understood in connection with the accompanying drawings in which:

FIG. 3 is an exploded view partly in axial section;

FIG. 4 is a top plan view of the ratchet with the switching segment in one of the working positions;

FIG. 5 is a corresponding top plan view with the switching segment in the releasing position; and FIG. 6 is a top plan view of the ratchet with the switching segment in its other working position.

Figure 1:
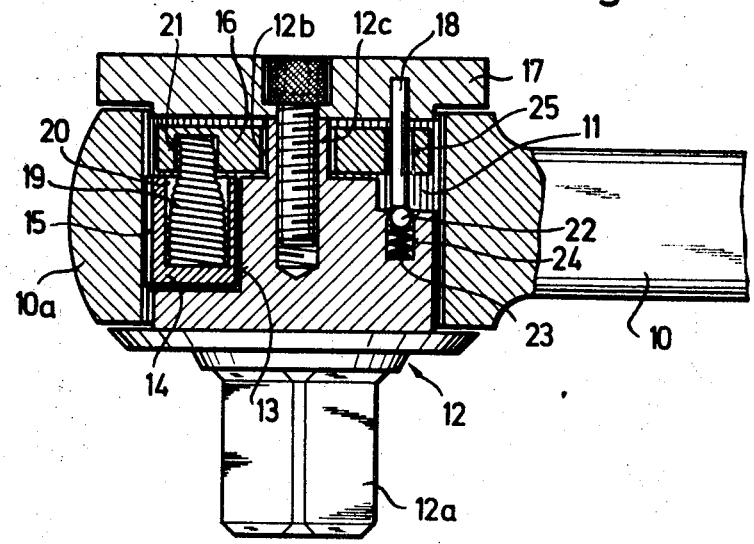
FIG. 1 is a ratchet in an axial section.
Figure 2:
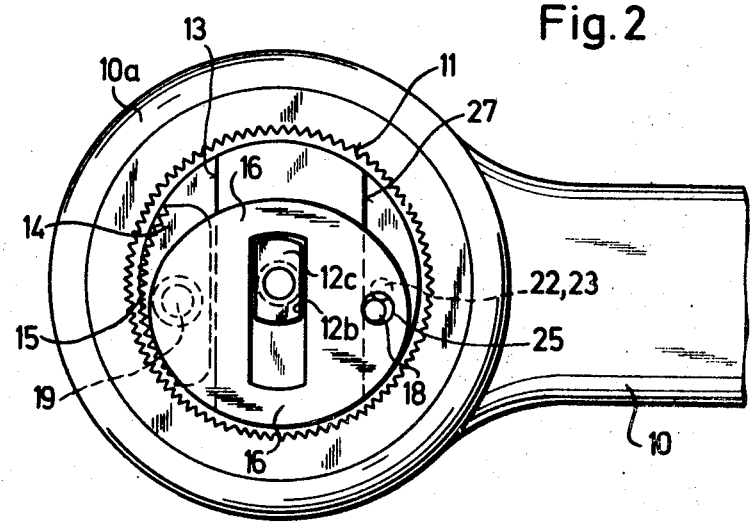
FIG. 2 is a top plan view of the ratchet shown in FIG. 1, the switching cover being removed for the purpose of better illustration.

Referring now to the drawings, the disclosed embodiments of the ratchet include a gripping part 10 of the ratchet, which is formed at its one end as a gripping member (not shown), while its other end member forms a catch bearing ring 10a, which has inwardly extending teeth 11. Inside of this bearing ring 10a is received a drive member 12, which has a one-sided extending axial projection 12a as a coupling member to a tool (not shown), to be served e.g. as socket wrench insert or the like. This drive member 12 has on one side a step-like set-off secantial recess 13 and on the opposite side a second secantial recess 26 and 27, whereby in the recess 13 a switching segment 14 is mounted which is equipped with outwardly extending teeth 15.

The drive member 12 has on its upper side an axial projection 12c operating as a sliding block including guide edges 12b extending parallel towards each other, on which axial projection 12c is guided, a control slide formed as an annular disc 16 crosswise to the axial direction of the drive member 12. This slide disc 16 is connected with a cover formed as a switching cover 17, closing up said ratchet on the top side, by means of a connecting pin 18, while the connection between the slide disc 16 and the switching segment 14 is brought about by a connecting member 19 extending axially and having characteristics of a resilient rod, the connecting member 19 being by example a helical spring one-sided, step-wise reduced.

This helical spring 19 is received with its step portion 19a of larger diameter in an axial receptacle 20 on the switching segment side, which receptacle 20 has an axial depth, which surpasses the axial length of the step portion 19a. The step part 19b of the helical spring 19 into an axial receptacle 21 on the side of the sliding block, which is disposed flush axially above the receptacle 20 of the switching segment 14. This switching joint itself resilient and formed as a step helical spring is subjected to forces directed crosswise to the longitudinal axis of the spring and is in position, not only to switch softly, to load the switching segment 14 in the sense of a decoupling and finally to function also in a manner of balancing out the distance.

The switching of the operational position takes place by means of the switching cover 17, which upon rotation over the joining pin 18 moves the sliding disc 16 crosswise to the longitudinal axis of the driving member 12. During this movement the switching segment 14 is moved by means of the switching joint 19, for example, from the one operative position, disclosed in FIG. 4, over the releasing position, disclosed in FIG. 5, into the other operative position, disclosed in FIG. 6.

The arresting of the individual operative positions takes place by a ball snapping device 22 and 23. The latter is provided on the secantial recess 26 and 27 and comprises substantially a ball 22 and a spring 23. Both structural elements are received in the axial recess 24 of the set step 26 and secured therein. The ball 22 cooperates with an arresting pin 18 projecting on one side from the side of the switching cover, which arresting pin 18 extends through the slide disc 16 within an axial break through 25 and comes into engagement with its shaft on the recess wall 27 and, thereby forms the abutment for the switching cover 17.

It is to be understood, that the shown and described embodiments constitute mere examples for the practical realization of the present invention. Rather also variations, particularly concerning the formation and configuration of the slide, as well as of the resilient switching joint, can be reailzed.

While I have disclosed one embodiment of the present invention, it is to be understood, that this embodiment is given by example only, and not in a limiting sense.

I claim:

1. A ratchet switchable into opposite directions of operation for a screw operation of screws and nuts, comprising a gripping part formed at its free end as a gripping handle, and forming at its other end a joint-bearing ring having inwardly extending teeth, a drive member equipped with an axial coupling projection, and a switching segment having outwardly extending teeth and supported on a step-shaped secantial recess of said drive member being provided as coupling member between said joint-bearing ring and said drive member, a switching cover, a switch-over member mounted on said drive member and operable by said switching cover by switching over in the sense of a change of operating direction, said switching-over member comprising a substantially annular sliding disc, a sliding block having oppositely disposed parallel guide edges, said sliding disc being linearly guided as an axial projection of said drive member in a direction crosswise to the longitudinal axis and full-faced supported outside of said sliding block on said drive member, said sliding block having on opposite points peripherally closed, axially directed receptacles for each coupling member connecting said switching cover with said sliding disc, as well as the latter with said switching segment, whereby said coupling member connecting said switching cover with said sliding disc being formed as an arresting pin passing through said sliding disc in an axially extending passing opening, said arresting pin being formed at its lower free end with a ball snapping device for the arresting of the working positions of said ratchet, said ball snapping device being received within a set step of a secantial recess of said drive body, while said coupling member connecting said sliding disc with said switching segment being formed as a switching joint having resilient rod characteristics self-elastic and return resilient crosswise to its longitudinal axis, and said switching joint being received within an axial bearing receptacle on the side of said switching segment and in a recess provided in said sliding disc in axial direction of said bearing receptacle, respectively.

2. The ratchet, as set forth in claim 1, wherein said sliding disc includes a guide-slot of a length surpassing the length of a pure switching stroke.

3. The ratchet, as set forth in claim 1, wherein said coupling member comprises a helical spring tapered down at least along parts of its axial length, said receptacle and recess, respectively, for said springs are adjusted to the respective diameters of said helical springs in case of a closing spring engagement, whereby said receptacle, receiving a step of said helical spring of larger diameter, has an axial depth surpassing that of said step of said helical spring, and thereby a step of said helical spring of smaller diameter overlaps over parts of their axial length with radial play.

References Cited

UNITED STATES PATENTS

| 2,981,389 | 4/1961 | Kilnes | 182—45.1 |
| 2,554,990 | 5/1951 | Kilness | 192—45.1 |

JAMES L. JONES, JR., Primary Examiner

U.S. Cl. X.R.

192—45.1, 46; 81—63.2